US010938226B2

(12) United States Patent
Ueda et al.

(10) Patent No.: US 10,938,226 B2
(45) Date of Patent: Mar. 2, 2021

(54) POWER CONTROL DEVICE

(71) Applicant: Mitsubishi Electric Corporation, Tokyo (JP)

(72) Inventors: Tomoyuki Ueda, Tokyo (JP); Yuichi Hayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 29 days.

(21) Appl. No.: 16/383,981

(22) Filed: Apr. 15, 2019

(65) Prior Publication Data

US 2019/0379220 A1 Dec. 12, 2019

(30) Foreign Application Priority Data

Jun. 11, 2018 (JP) .................................. 2018-110832

(51) Int. Cl.
*H02J 7/00* (2006.01)
*B60L 3/00* (2019.01)
*H02J 9/00* (2006.01)
*B60L 50/60* (2019.01)
*B60L 50/51* (2019.01)
*H02P 27/06* (2006.01)
*H02J 7/34* (2006.01)

(52) U.S. Cl.
CPC .............. *H02J 7/0029* (2013.01); *B60L 3/00* (2013.01); *B60L 50/51* (2019.02); *B60L 50/60* (2019.02); *H02J 9/00* (2013.01); *B60L 2210/40* (2013.01); *H02J 7/345* (2013.01); *H02P 27/06* (2013.01)

(58) Field of Classification Search
CPC ....................................................... H02J 7/0029
See application file for complete search history.

(56) References Cited

U.S. PATENT DOCUMENTS 9,043,066 B2 * 5/2015 Kanzaki ................ B60L 3/0092
701/22
9,873,393 B2 * 1/2018 Nishijima ............. H02J 7/0063

FOREIGN PATENT DOCUMENTS

JP       2011-244625 A    12/2011
JP          5333348 B2    11/2013

* cited by examiner

*Primary Examiner* — Hai L Nguyen
(74) *Attorney, Agent, or Firm* — Sughrue Mion, PLLC; Richard C. Turner

(57) ABSTRACT

Provided is a power control device, for a vehicle, that is excellent in efficient discharge of energy stored in a smoothing capacitor provided in the power control device. The level of an output voltage of a backup power supply unit for generating, from energy of the smoothing capacitor, drive power required for a discharge operation is switched so as to be equal to or higher than the level of the voltage of an auxiliary battery during the discharge operation. Accordingly, the power control device contributes to shortening of a time period for discharge of the smoothing capacitor, and contributes to reduction in the number of times of charging/discharging of the auxiliary battery since power supplied from the auxiliary battery can be reduced during the discharge operation.

12 Claims, 7 Drawing Sheets

POWER CONTROL DEVICE

BACKGROUND OF THE INVENTION

1. Field of the Invention

The present disclosure relates to a power control device.

2. Description of the Background Art

To a power control device mounted to an electric vehicle or a hybrid car, high voltage is applied from a high-voltage battery having a voltage of 200 to 400 V. For a motor generator, this high voltage may be used without being unchanged or may be used after being further stepped up. In this case, if charge (energy) remains in a capacitor (hereinafter, referred to as "smoothing capacitor") for smoothing voltage in the power control device, an electric shock may occur. Specifically: at the time of repair or inspection of the vehicle, this electric shock may occur when a worker touches a high-voltage portion; and, at the time of a crash of the vehicle, this electric shock may occur when a driver or a passenger, or a rescuer touches the high-voltage portion. Thus, at the time of a crash and at the end of a normal operation, the smoothing capacitor needs to perform discharge so as to have such a voltage that a person does not suffer any electric shock even when making a touch.

As a conventional technology for addressing these problems, for example, Patent Document 1 discloses the following configuration: if, at the time of occurrence of a crash or the like of a vehicle, an abnormality (breakage or voltage reduction) of a power line from an auxiliary battery supplying power to a discharge control unit for a smoothing capacitor is detected and an abnormality (breakage or voltage reduction) of a communication line for reporting the crash to the discharge control unit is present, power is supplied from the outside to the discharge control unit by a backup power supply so that charge that is stored in the capacitor is discharged.

In addition, Patent Document 2 discloses the following configuration: at least power required for a discharge operation at the time of discharge is supplied by a backup power supply; power is constantly supplied to a discharge control unit in a state where a backup power supply Eb and a power source Es such as a converter circuit or a DC power supply such as a battery are disposed in parallel; and power for emergency is supplied from the backup power supply Eb when a situation occurs in which power cannot be supplied from the power source Es owing to a certain interruption factor.

Patent Document 1: Japanese Patent No. 5333348
Patent Document 2: Japanese Laid-Open Patent Publication No. 2011-244625

However, the number of times of charging/discharging of the auxiliary battery increases with the configuration in which, as in Patent Document 1, output from a backup power supply unit is used only when an abnormality of the power line from the auxiliary battery occurs owing to a crash or a certain interruption factor, and power from the auxiliary battery is used in a normal discharge operation. In addition, in Patent Document 2, a problem arises in that a time period for normal discharge increases in proportion to increase in the capacity of the smoothing capacitor since power from the backup power supply is not used at the time of a normal discharge operation.

SUMMARY OF THE INVENTION

The present disclosure has been made to solve the above problems, and an object of the present disclosure is to provide a power control device that contributes to reduction in the number of times of charging/discharging of an auxiliary battery, and enables a time period for discharge of a smoothing capacitor to be shortened.

A power control device according to the present disclosure is a power control device including:

a first smoothing capacitor configured to smooth output of a high-voltage battery of a vehicle;

a step-up converter configured to step up a voltage smoothed by the first smoothing capacitor;

a second smoothing capacitor configured to smooth output of the step-up converter;

an inverter to which a voltage smoothed by the second smoothing capacitor is inputted;

a gate controller configured to perform a discharge operation for discharging the first smoothing capacitor and the second smoothing capacitor;

a backup power supplier connected to the first smoothing capacitor or the second smoothing capacitor and configured to supply power to the gate controller; and an output voltage switch configured to set, during a normal operation, a voltage of the backup power supplier to be equal to or lower than a voltage supplied from an auxiliary battery to the gate controller, and switch, during the discharge operation by the gate controller, the voltage of the backup power supplier to be equal to or higher than the voltage supplied from the auxiliary battery.

With the power control device according to the present disclosure, charged energy of the smoothing capacitors disposed in a housing of the power control device can be effectively discharged, whereby the reliability of the discharge operation can be improved.

In addition, the power control device can contribute to reduction in the number of times of charging/discharging of the auxiliary battery since power supplied from the auxiliary battery is reduced, by setting the output of the backup power supply unit at the time of discharge to a voltage not lower than the voltage from the auxiliary battery. Furthermore, the power control device can contribute to shortening of a discharge time period by using the charged energy of the smoothing capacitors.

DETAILED DESCRIPTION OF THE PREFERRED EMBODIMENTS OF THE INVENTION

Figure 1:
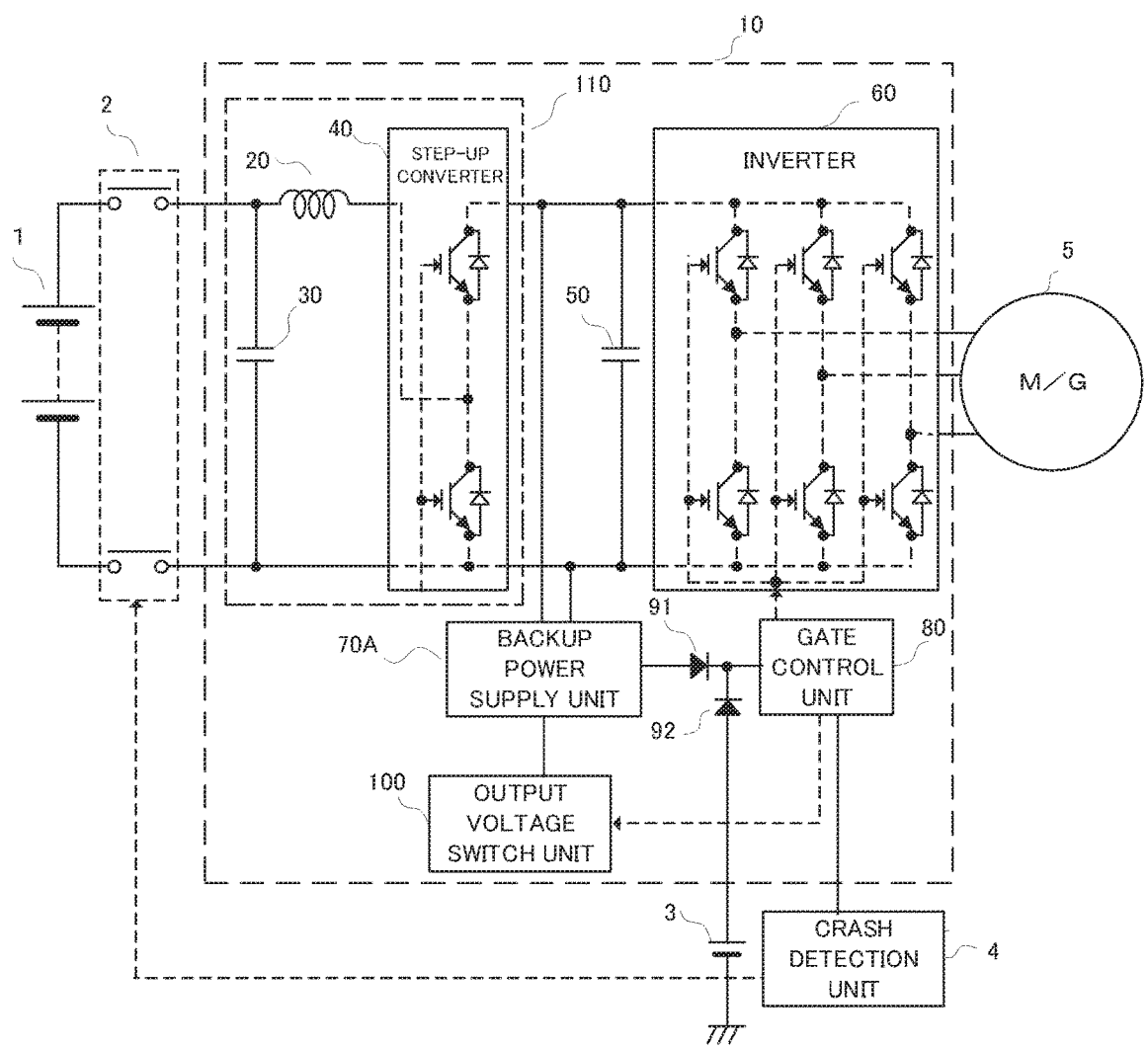
FIG. 1 is a block diagram of the entirety of a vehicle mounted with a power control device according to embodiment 1.

Preferred embodiments of a power control device according to the present disclosure will be described below with reference to the drawings. The same terms and corresponding components are denoted by the same reference characters, and detailed description thereof will be omitted. Also in the subsequent embodiment, repeated description of components denoted by the same reference characters will be omitted in the same manner.

Embodiment 1

FIG. 1 is a block diagram of the entirety of a vehicle mounted with a power control device according to embodiment 1.

The vehicle includes a high-voltage battery 1, a contactor 2, an auxiliary battery 3, a crash detection unit 4, a motor generator 5, and a power control device 10.

The high-voltage battery 1 is a chargeable power storage device, and is implemented by a secondary battery using nickel hydrogen, lithium ion, or the like.

The contactor 2 is for making connection so as to transmit power of the high-voltage battery 1 to the power control device 10. When the crash detection unit 4 detects a crash, the contactor 2 is turned off so that power supply from the high-voltage battery 1 is interrupted.

The auxiliary battery 3 is a chargeable power storage device, and is implemented by a lead storage battery or the like.

Figure 6:
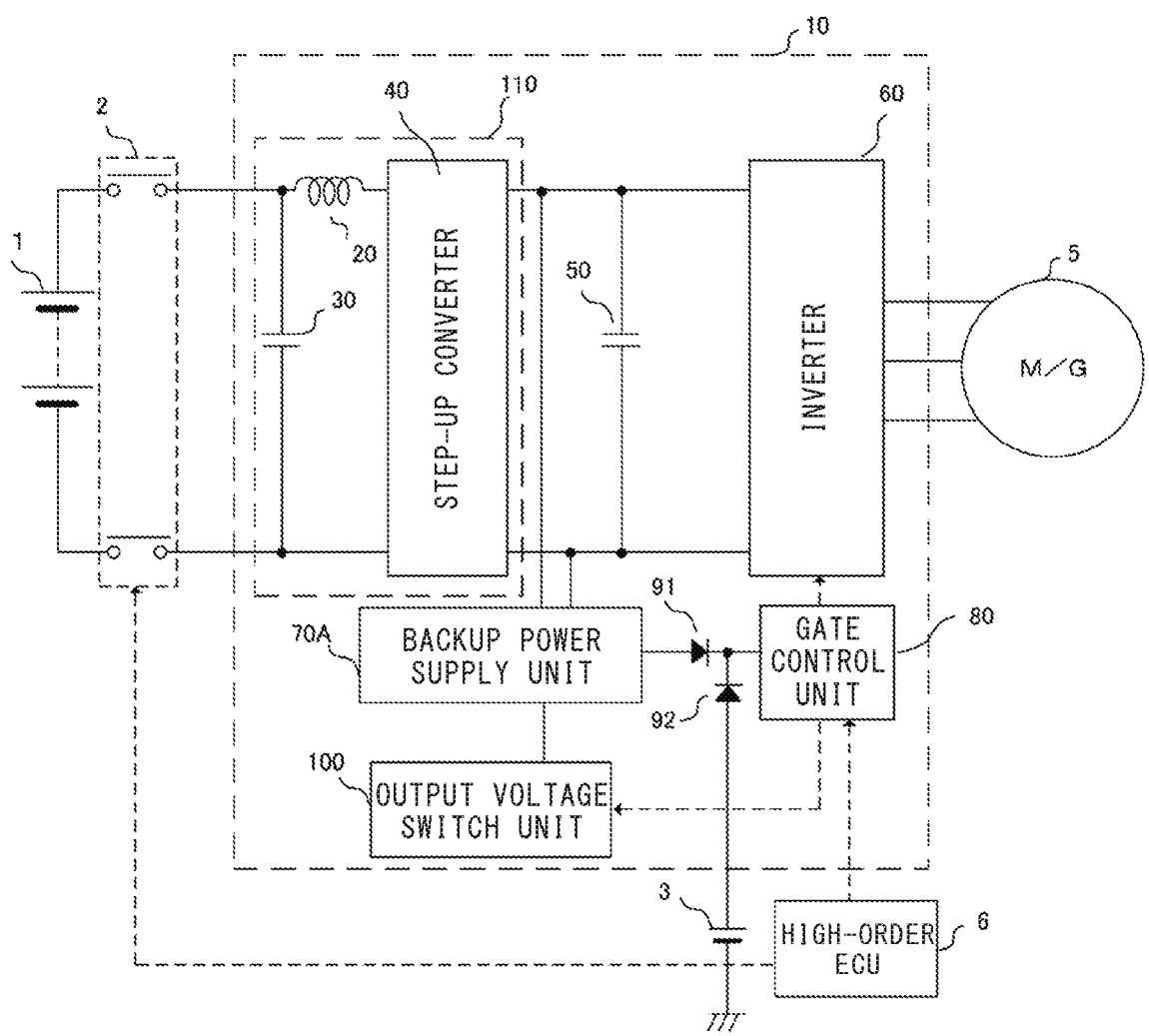
FIG. 6 is a block diagram of the entirety of a vehicle mounted with a power control device according to embodiment 3.

When detecting a crash of the vehicle, the crash detection unit 4 reports a detected signal to a gate control unit 80 in the power control device 10 described later, and turns off the contactor 2. Methods for the reporting from the crash detection unit 4 to the gate control unit 80 include a method of directly inputting a signal to the power control device 10, and a method of sending a command from a high-order device such as an ECU to the power control device 10, as shown in FIG. 6 described later.

The motor generator 5 is driven by the power control device 10, thereby generating drive torque of the vehicle. The motor generator 5 regenerates energy when, for example, the vehicle is braked.

The power control device 10 includes: an inverter unit 60 for driving the motor generator 5; a step-up converter unit 110; the gate control unit 80 which performs discharge control; a backup power supply unit 70A which supplies drive power to the gate control unit 80; and an output voltage switch unit 100 which switches an output voltage of the backup power supply unit 70A. These units are disposed in the same housing of the power control device 10.

The step-up converter unit 110 which steps up a voltage from the high-voltage battery 1 so as to generate a voltage for the inverter unit 60, is composed of: a step-up converter reactor 20; a first smoothing capacitor 30; and a step-up converter 40 in which switching elements are arranged in series. The first smoothing capacitor 30 is a capacitor that performs smoothing so as to reduce variation in voltage between the step-up converter reactor 20 and the step-up converter 40. The step-up converter unit 110 supplies power having been supplied from the high-voltage battery 1 to the inverter unit 60 for driving the motor generator 5, with the power having a voltage unchanged from that of the supplied power or with the power being converted so as to have a stepped-up voltage.

A second smoothing capacitor 50 is a capacitor that performs smoothing so as to reduce variation between the voltage stepped up by the step-up converter unit 110 and a voltage of the inverter unit 60.

The inverter unit 60 converts a voltage outputted from the step-up converter unit 110 and smoothed by the second smoothing capacitor 50, to perform drive control of the motor generator 5. Specifically, the inverter unit 60 is a bridge circuit composed of three-phase switching elements, and converts, into three-phase AC power, DC power transmitted from the step-up converter unit 110. In addition, the inverter unit 60 regenerates energy when, for example, the vehicle is braked.

The backup power supply unit 70A is connected between the step-up converter unit 110 and the inverter unit 60, and, during a normal operation, constantly outputs a voltage lower than the voltage of the auxiliary battery 3. When the crash detection unit 4 detects a crash, the output voltage switch unit 100 switches the output voltage of the backup power supply unit 70A to a voltage higher than the voltage of the auxiliary battery 3. Owing to this switching of the output voltage, energy charged in high-voltage capacitors in the power control device 10, i.e., the second smoothing capacitor 50 and the first smoothing capacitor 30, is efficiently consumed and discharged even when power continues to be supplied from the auxiliary battery 3 at the time of the crash.

The gate control unit 80 receives a crash detection signal from the crash detection unit 4, and drives the inverter unit 60, thereby performing control so as to cause the first smoothing capacitor 30 and the second smoothing capacitor 50 to be discharged. The output voltage switch unit 100 switches the output voltage of the backup power supply unit 70A to a voltage higher than the voltage of the auxiliary battery 3 (in the drawing, dashed arrows indicate commands).

A first backflow prevention diode 91 and a second backflow prevention diode 92 are backflow prevention diodes that cause power for driving the gate control unit 80 to be supplied from the backup power supply unit 70A and the auxiliary battery 3. During a normal operation, since the output voltage from the backup power supply unit 70A is lower than the voltage from the auxiliary battery 3, the gate control unit 80 is driven by the power from the auxiliary battery 3. When a crash is detected, since the output voltage switch unit 100 performs switching such that the voltage from the backup power supply unit 70A becomes higher than the voltage from the auxiliary battery 3, the gate control unit 80 is driven by the power from the backup power supply unit 70A.

Figure 2:
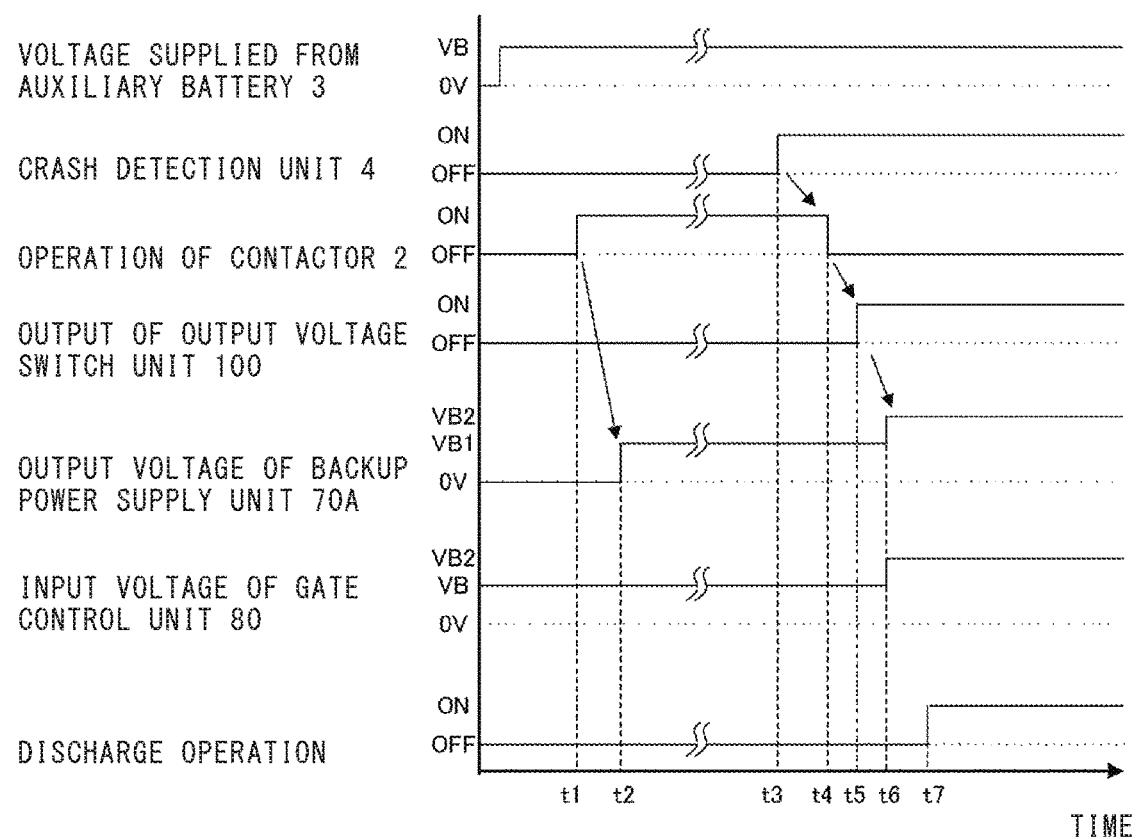
FIG. 2 is a timing chart indicating an operation of output by a backup power supply unit in FIG. 1.

FIG. 2 is a timing chart for an operation of the power control device explained in FIG. 1. The vertical axis indicates ON and OFF of operations, or states of input/output voltages, of respective components. The horizontal axis indicates flow of time. The contactor 2 having been turned on at a time t1 is turned off at a time t4 as a result of a signal from the crash detection unit 4 entering an ON state at a time t3, so that power supply from the high-voltage battery 1 is interrupted. The signal from the crash detection unit 4 having entered the ON state at the time t3 when a crash is detected, is inputted also to the gate control unit 80, and the output voltage switch unit 100 is turned on at a time t5 in response to a command from the gate control unit 80, so that an output voltage VB1 of the backup power supply unit 70A is switched to an output voltage VB2 that is not lower than a voltage VB of the auxiliary battery 3 (time t6). Accordingly, energy stored in the first smoothing capacitor 30 and the second smoothing capacitor 50 in the power control device 10 is outputted from the backup power supply unit 70A, and the gate control unit 80 controls the inverter unit 60, thereby performing a discharge operation (time t7). The discharge operation is continued until the voltage decreases to have such a level that a person does not suffer any electric shock even when making a touch. The discharge operation is completed at the time point when the voltage decreases to this level or lower.

In FIG. 2, the output of the output voltage switch unit 100 is ON after the contactor 2 is turned from on to off. However, the output may be ON before the contactor 2 is turned off.

In addition, constant output of the backup power supply unit 70A is started at a timing (time t2) after the contactor 2 is turned on at the time t1. Accordingly, prompt fault detection as to a voltage abnormality of the backup power supply unit 70A is easily performed.

In the description made in reference to FIG. 1 and FIG. 2, the discharge operation is started when a crash is detected. However, the same discharge operation may be started when communication disruption, an abnormality of any of voltage sensors, or the like is detected at the end of a normal operation. The same applies to embodiments 2 and 3 described later.

Figure 3:
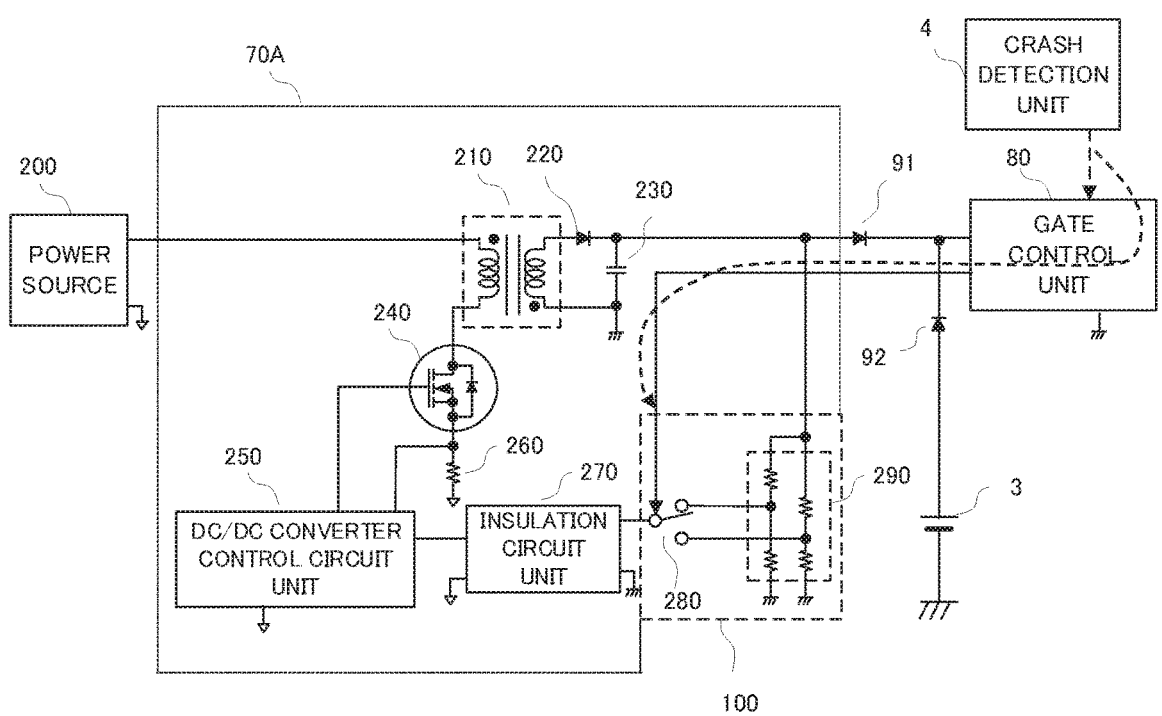
FIG. 3 is a diagram indicating a circuit configuration of an output voltage switch unit in FIG. 1.

FIG. 3 is an example of circuit configurations of the backup power supply unit 70A and the output voltage switch unit 100 shown in FIG. 1. For example, the backup power supply unit 70A is connected as a basic flyback power supply circuit between the step-up converter unit 110 and the inverter unit 60 shown in FIG. 1, and power to be transmitted through lines of the backup power supply unit 70A is outputted from a power source 200 in FIG. 3. Connection is made such that power from the power source 200 is transmitted to the primary side of an isolation transformer 210, and a switching element 240 is turned on/off so that the power is transmitted to the secondary side of the isolation transformer 210. A diode 220 and a smoothing capacitor 230 rectify and smooth output from the isolation transformer 210. The smoothed voltage is divided by a feedback resistor unit 290, and voltages obtained by the division are fed back to a DC/DC converter control circuit unit 250 after being insulated by an insulation circuit unit 270, whereby an output voltage of the backup power supply unit 70A is determined. The feedback resistor unit 290 has one or more types of setting such that each of the voltages divided for respective set output voltages can be used as a feedback voltage. The feedback voltage is switched by a feedback voltage switch unit 280. The feedback voltage switch unit 280 is disposed at a stage subsequent to the feedback resistor unit 290, but may be disposed at a stage preceding thereto.

At the time of a crash of the vehicle, the gate control unit 80 having received a signal regarding the crash from the crash detection unit 4 causes the feedback voltage switch unit 280 to switch output of the feedback voltage from the feedback resistor unit such that the output voltage of the backup power supply unit 70A becomes higher than the voltage of the auxiliary battery 3. The feedback voltage switch unit 280 is implemented by a switching element such as a transistor or a MOSFET (Metal-Oxide-Semiconductor Field-Effect-Transistor). The insulation circuit unit 270 is implemented by an insulative component such as an insulation amplifier IC or a photocoupler. The power source 200 may be disposed between the high-voltage battery 1 and the step-up converter unit 110 as in FIG. 4 which is described later.

In the power control device as described above in embodiment 1, the energy of the smoothing capacitors disposed in the housing can be effectively discharged, and thus, not only at the time of a crash but also at the end of a normal operation, a person does not suffer any electric shock even when opening the housing and touching the inside thereof, whereby the reliability can be sufficiently improved.

In addition, a power control device can be provided that can contribute to reduction in the number of times of charging/discharging of the auxiliary battery since power supplied from the auxiliary battery is reduced, by setting the output of the backup power supply unit at the time of discharge to a voltage not lower than the voltage from the auxiliary battery, and can contribute to shortening of a discharge time period by using the charged energy of the smoothing capacitors in the housing.

Moreover, it is possible to promptly detect an abnormality of the backup power supply unit by the constant output from the backup power supply unit being performed in a state where the output is switched by the output voltage switch unit so as to have a voltage level not higher than the voltage level of the auxiliary battery at a time other than the time of the discharge operation.

Embodiment 2

Figure 4:
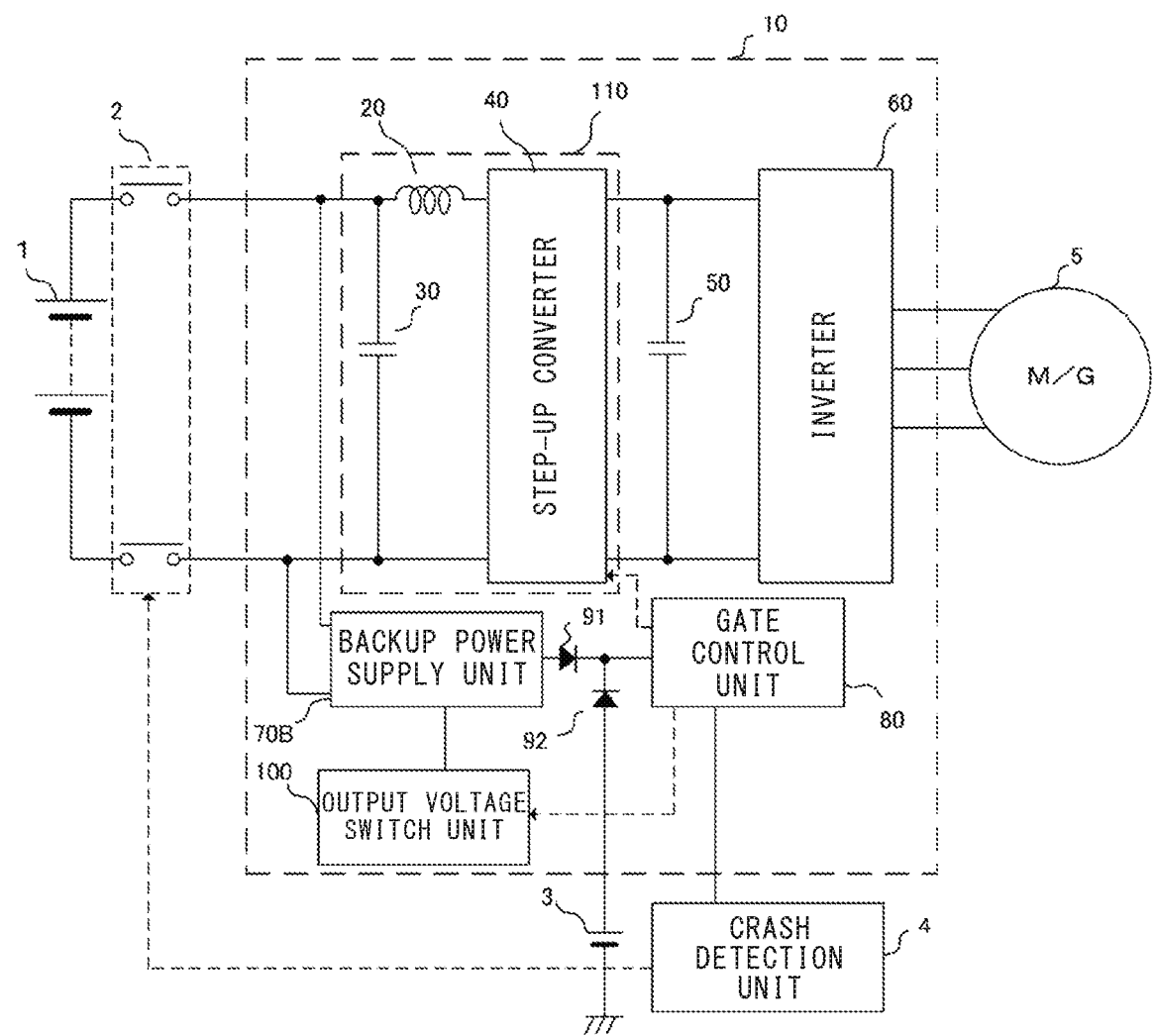
FIG. 4 is a block diagram of the entirety of a vehicle mounted with a power control device according to embodiment 2.

FIG. 4 is a block diagram of the entirety of a vehicle mounted with a power control device according to embodiment 2. The configuration and the name of each component are the same as those in FIG. 1. However, a portion to which a backup power supply unit 70B is connected, and a location at which the discharge control is performed, are different from those in FIG. 1. In FIG. 1, the backup power supply unit 70A is connected between the step-up converter unit 110 and the inverter unit 60, whereas, in FIG. 4, the backup power supply unit 70B is connected between the high-voltage battery 1 and the step-up converter unit 110. In addition, the discharge control is performed by the step-up converter 40. During a discharge operation at the time of a crash or the like, a voltage generated by the backup power supply unit 70B from energy of the first smoothing capacitor 30 is supplied to the gate control unit 80, and the discharge control is performed by the step-up converter unit 110. However, since the first smoothing capacitor 30 has a smaller capacity than the second smoothing capacitor 50, it is predicted that the energy of the first smoothing capacitor 30 is used up before the second smoothing capacitor 50 is discharged. When the energy is used up, the output cannot be performed from the backup power supply unit 70B. Thus, the energy of the second smoothing capacitor 50 is stepped down with use of the switching elements of the step-up converter 40 and is supplied to the backup power supply unit 70B, before the energy of the first smoothing capacitor 30 is used up. By doing so, the output from the backup power supply unit 70B is stably supplied until the discharge operation is completed.

Figure 5:
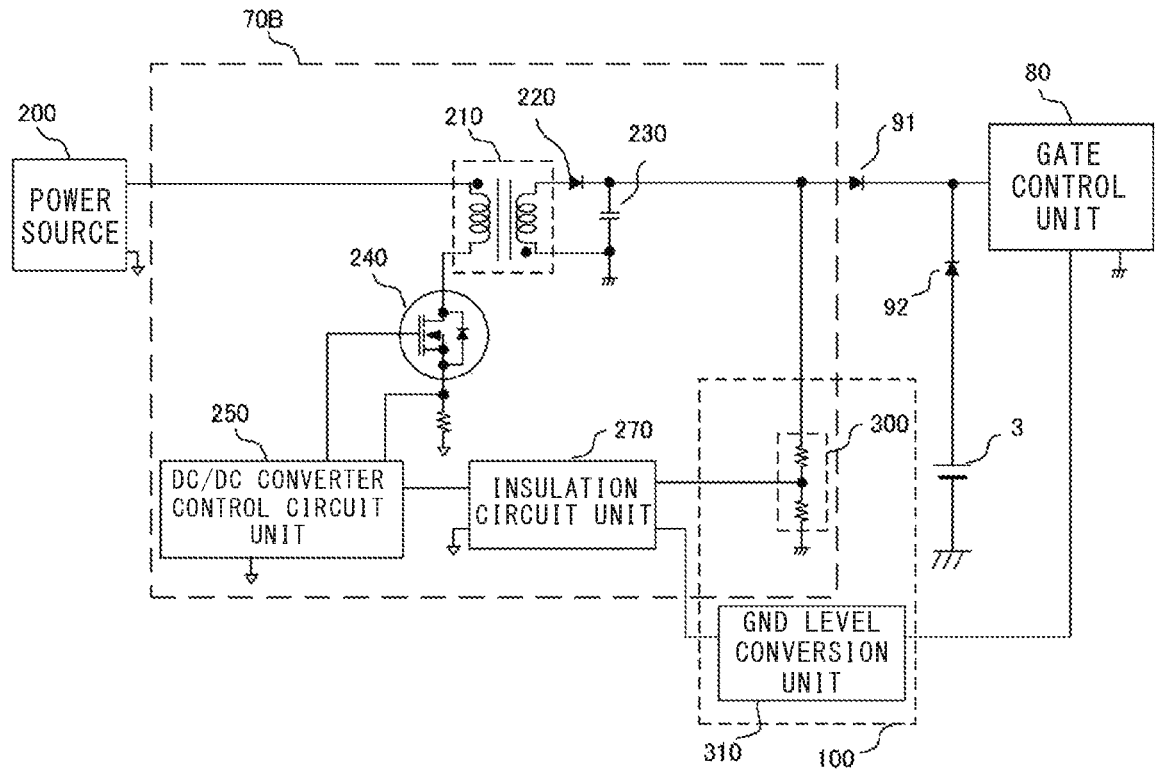
FIG. 5 is a diagram indicating a circuit configuration of the output voltage switch unit in FIG. 4.

FIG. 5 is a diagram indicating a circuit configuration of the output voltage switch unit 100 shown in FIG. 4. The output voltage switch unit 100 is the same basic flyback power supply circuit as that in FIG. 3, but is different therefrom in that each feedback voltage is adjusted by inputting a voltage to a low-voltage side ground (GND) of the insulation circuit unit 270. During a normal operation in which no discharge operation is performed, the potential of the low-voltage side GND of the insulation circuit unit is made zero such that the output voltage from the backup power supply unit 70B becomes equal to or lower than the voltage of the auxiliary battery 3. When a discharge operation command is outputted from the gate control unit 80, the output of a GND level conversion unit 310 reduces the feedback voltage to the insulation circuit unit 270 by input of a positive voltage not lower than the voltage of the GND but not higher than the output voltage from a feedback resistor unit 300. The DC/DC converter control circuit unit 250 having the reduced feedback voltage performs control to increase the output voltage of the backup power supply unit 70B such that the level of the feedback voltage reaches that of a set voltage, and a voltage higher than that of the auxiliary battery 3 is supplied from the backup power supply unit 70B to the gate control unit 80.

The power control device as described above in embodiment 2 exhibits the following effects in addition to the effects in embodiment 1: a withstand voltage can be reduced, and thus the circuits can be configured at lower cost, and the output of the backup power supply unit can be stably supplied until the discharge operation is completed.

Embodiment 3

FIG. 6 is a block diagram of the entirety of a vehicle mounted with a power control device according to embodiment 3. A high-order ECU (Engine Control Unit) is connected instead of the crash detection unit 4 in the block diagram shown in FIG. 1. The high-order ECU 6 includes a microcontroller for outputting drive torque, a discharge command, and other commands from the high-order side to the power control device 10. At the time of a crash, the high-order ECU 6 detects the crash and communicates with the power control device 10, thereby causing a microcomputer (not shown) in the power control device 10 to drive the gate control unit 80. Alternatively, at the end of driving, a command of a discharge operation to be performed at the end of driving is communicated from the high-order ECU 6 to the power control device 10, thereby causing the microcomputer in the power control device 10 to drive the gate control unit 80.

Figure 7:
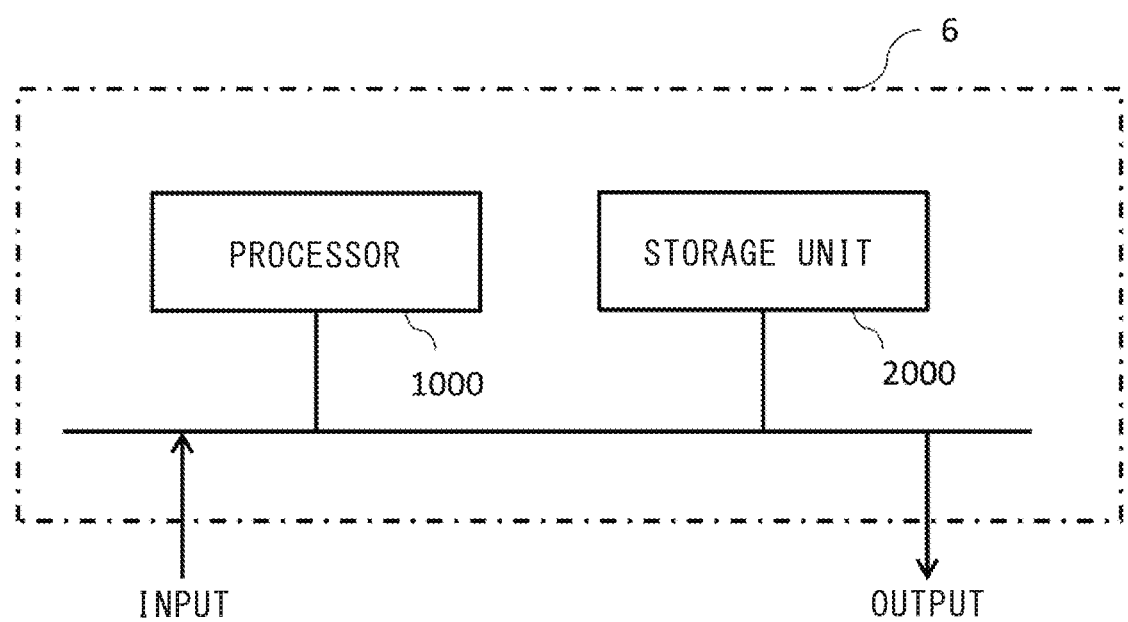
FIG. 7 is a diagram indicating an example of hardware of a high-order ECU 6 and a microcomputer in the power control device 10 in embodiment 3.

FIG. 7 shows an example of hardware of the high-order ECU 6 and the microcomputer in the power control device 10. The hardware is composed of a processor 1000 and a storage unit 2000. Although not shown, the storage unit includes a volatile storage unit such as a random access memory and a nonvolatile auxiliary storage unit such as a flash memory. Alternatively, the storage unit may include, as the auxiliary storage unit, a hard disk instead of the flash memory. The processor 1000 executes a program inputted from the storage unit 2000, thereby, for example, causing the high-order ECU 6 to detect a crash and communicate with the power control device as described above. In this case, the program is inputted from the auxiliary storage unit via the volatile storage unit to the processor 1000. In addition, the processor 1000 may output data such as a calculation result to the volatile storage unit of the storage unit 2000, or may save the data in the auxiliary storage unit via the volatile storage unit.

The power control device as described above in embodiment 3 exhibits the following effects in addition to the effects in embodiment 1: by using the high-order ECU, detection of an event other than a crash can also be easily enabled, i.e., versatility can be enhanced, and the circuit scale can be reduced.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the present disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 high-voltage battery
2 contactor
3 auxiliary battery
4 crash detection unit
5 motor generator
6 high-order ECU
10 power control device
20 step-up converter reactor
30 first smoothing capacitor
40 step-up converter
50 second smoothing capacitor
60 inverter unit
70A, 70B backup power supply unit
80 gate control unit
91 first backflow prevention diode
92 second backflow prevention diode
100 output voltage switch unit
110 step-up converter unit
200 power source
210 isolation transformer
220 diode
230 smoothing capacitor
240 switching element.
250 DC/DC converter control circuit unit
270 insulation circuit unit
280 feedback voltage switch unit
290, 300 feedback resistor
310 GND level conversion unit

What is claimed is:
1. A power control device comprising:
a first smoothing capacitor configured to smooth output of a high-voltage battery of a vehicle;
a step-up converter configured to step up a voltage smoothed by the first smoothing capacitor;
a second smoothing capacitor configured to smooth output of the step-up converter;
an inverter to which a voltage smoothed by the second smoothing capacitor is inputted;
a gate controller configured to:
receive a control signal, and
perform, responsive to the control signal, a discharge operation for discharging the first smoothing capacitor and the second smoothing capacitor;
a backup power supplier connected to the first smoothing capacitor or the second smoothing capacitor and configured to supply power to the gate controller; and
an output voltage switch configured to set, during a normal operation, a voltage of the backup power supplier to be equal to or lower than a voltage supplied from an auxiliary battery to the gate controller, and switch, based on the control signal, the voltage of the backup power supplier to be higher than the voltage supplied from the auxiliary battery.
2. The power control device according to claim 1, further comprising a crash detector configured to generate the control signal when a crash is detected.

3. The power control device according to claim 2, wherein
the backup power supplier is connected between the step-up converter and the inverter, and
the gate controller controls the inverter, thereby performing the discharge operation.

4. The power control device according to claim 2, wherein
the backup power supplier is connected between the high-voltage battery and the step-up converter, and
the gate controller controls the step-up converter, thereby performing the discharge operation.

5. The power control device according to claim 4, wherein,
when a voltage of the first smoothing capacitor becomes equal to or lower than an operation power supply voltage of the backup power supplier during the discharge operation, energy of the second smoothing capacitor is supplied after being stepped down.

6. The power control device according to claim 2, wherein
the backup power supplier supplies power to the gate controller from a time point at which power is supplied from the high-voltage battery.

7. The power control device according to claim 1, wherein
the backup power supplier is connected between the step-up converter and the inverter, and
the gate controller controls the inverter, thereby performing the discharge operation.

8. The power control device according to claim 1, wherein
the backup power supplier is connected between the high-voltage battery and the step-up converter, and
the gate controller controls the step-up converter, thereby performing the discharge operation.

9. The power control device according to claim 8, wherein,
when a voltage of the first smoothing capacitor becomes equal to or lower than an operation power supply voltage of the backup power supplier during the discharge operation, energy of the second smoothing capacitor is supplied after being stepped down.

10. The power control device according to claim 1, wherein
the backup power supplier supplies power to the gate controller from a time point at which power is supplied from the high-voltage battery.

11. The power control device according to claim 1, wherein the control signal is generated at an end of a normal operation of a vehicle comprising the power control device.

12. A power control device comprising:
a first smoothing capacitor configured to smooth output of a high-voltage battery of a vehicle;
a step-up converter configured to step up a voltage smoothed by the first smoothing capacitor;
a second smoothing capacitor configured to smooth output of the step-up converter;
an inverter to which a voltage smoothed by the second smoothing capacitor is inputted;
a gate controller configured to:
receive a control signal, and
perform, responsive to the control signal, a discharge operation for discharging the first smoothing capacitor and the second smoothing capacitor;
a backup power supplier connected to the first smoothing capacitor or the second smoothing capacitor and configured to supply power to the gate controller, wherein the backup power supplier includes a dc/dc power conversion circuit; and
an output voltage switch configured to set, during a normal operation, a voltage of the backup power supplier to be at a first predetermined voltage from a first voltage divider equal to or lower than a voltage supplied from an auxiliary battery to the gate controller, and switch, based on the control signal, the voltage of the backup power supplier to be at a second predetermined voltage from a second voltage divider higher than the voltage supplied from the auxiliary battery.

* * * * *